US009329035B2

(12) United States Patent
Oggier

(10) Patent No.: US 9,329,035 B2
(45) Date of Patent: May 3, 2016

(54) METHOD TO COMPENSATE FOR ERRORS IN TIME-OF-FLIGHT RANGE CAMERAS CAUSED BY MULTIPLE REFLECTIONS

(71) Applicant: MESA Imaging AG, Zurich (CH)

(72) Inventor: Thierry Oggier, Zurich (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 42 days.

(21) Appl. No.: 13/712,087

(22) Filed: Dec. 12, 2012

(65) Prior Publication Data

US 2013/0148102 A1    Jun. 13, 2013

Related U.S. Application Data

(60) Provisional application No. 61/569,451, filed on Dec. 12, 2011.

(51) Int. Cl.
| | | |
|---|---|---|
| G01C 3/08 | (2006.01) | |
| G01S 17/36 | (2006.01) | |
| G01S 17/89 | (2006.01) | |
| G01S 7/491 | (2006.01) | |

(52) U.S. Cl.
CPC .............. *G01C 3/08* (2013.01); *G01S 7/4911* (2013.01); *G01S 7/4915* (2013.01); *G01S 17/36* (2013.01); *G01S 17/89* (2013.01)

(58) Field of Classification Search
CPC ....... G01S 17/89; G01S 17/88; G01S 7/4915; G01S 17/36; G01B 11/2513; G06T 7/0065; G01C 3/08

USPC .......................................................... 356/5.01
See application file for complete search history.

(56) References Cited

U.S. PATENT DOCUMENTS

| | | | | |
|---|---|---|---|---|
| 2004/0213463 | A1* | 10/2004 | Morrison | 382/210 |
| 2007/0018977 | A1* | 1/2007 | Niem et al. | 345/422 |
| 2010/0182406 | A1* | 7/2010 | Benitez | 348/46 |
| 2011/0025843 | A1 | 2/2011 | Oggier et al. | |
| 2012/0033045 | A1 | 2/2012 | Schweizer et al. | |
| 2012/0038903 | A1* | 2/2012 | Weimer et al. | 356/4.07 |
| 2013/0088726 | A1* | 4/2013 | Goyal et al. | 356/634 |
| 2013/0100256 | A1* | 4/2013 | Kirk et al. | 348/48 |

OTHER PUBLICATIONS

Mure-Dubois et al, optimized scattering compensation for time of flight camera, 2007, SPIE, vol. 6762.*
Oggier, T. et al., "An all-solid-state optical range camera for 3D real-time imaging with sub-centimeter depth resolution (SwissRanger™)," Optical Design and Engineering, Proceedings of the SPIE, 2004, vol. 5249, pp. 534-545.

* cited by examiner

*Primary Examiner* — Luke Ratcliffe
*Assistant Examiner* — Vicente Rodriguez
(74) *Attorney, Agent, or Firm* — Fish & Richardson P.C.

(57) ABSTRACT

Due to their parallel illumination and acquisition for all the pixels, today's state-of-the-art time-of-flight (TOF) range cameras suffer from erroneous measurements caused by multiple reflections in the scene. The invention proposes to compensate for the multi-path fusing the results obtained by applying two spatially different illumination schemes, typically one to achieve highest possible lateral resolution and for the second one structuring the emitted light and by doing so lowering the lateral resolution but limiting the impact of multiple reflections.

4 Claims, 4 Drawing Sheets

METHOD TO COMPENSATE FOR ERRORS IN TIME-OF-FLIGHT RANGE CAMERAS CAUSED BY MULTIPLE REFLECTIONS

RELATED APPLICATIONS

This application claims the benefit under 35 USC. 119(e) of U.S. Provisional Application No. 61/569,451, filed on Dec. 12, 2011, which is incorporated herein by reference in its entirety.

BACKGROUND OF THE INVENTION 3D time-of-flight (TOP) cameras are active optical depth measurement systems. In general, TOF systems are based on the phase-measurement technique of emitted intensity-modulated light, which is reflected by the scene. The reflected light is imaged onto a sensor. The photo-generated electrons are demodulated in the sensor. Based on the phase information, the distance for each pixel is deduced. A more detailed description is presented by Oggier et al. in "An all-solid-state optical range camera for 3D real-time imaging with sub-centimeter depth resolution (SwissRanger)", Proc. Of the SPIE, Vol. 5249, pp. 534-545, 2004.

SUMMARY OF THE INVENTION

Due to their parallel illumination and acquisition for all the pixels, today's state-of-the-art time-of-flight (TOP) range cameras suffer from erroneous measurements caused by multiple reflections in the scene.

The invention here proposes to compensate for the multipath fusing the results obtained by applying two spatially different illumination schemes, typically one to achieve highest possible lateral resolution and for the second one structuring the emitted light and by doing so lowering the lateral resolution but hunting the impact of multiple reflections.

Applying two different field-of-illuminations enables to keep the high lateral resolution of a typical TOF camera and at the same time reduce to error of multi-path, as typically achieved by a lower resolution image.

It can be imagined that the two field-of-illuminations are combined into a more sophisticated single field-of-illumination.

BRIEF DESCRIPTION OF THE DRAWINGS

In the accompanying drawings, reference characters refer to the same parts throughout the different views. The drawings. are not necessarily to scale; emphasis has instead been placed upon illustrating the principles of the invention. Of the drawings.

DETAILED DESCRIPTION OF THE PREFERRED EMBODIMENTS

Figure 1:
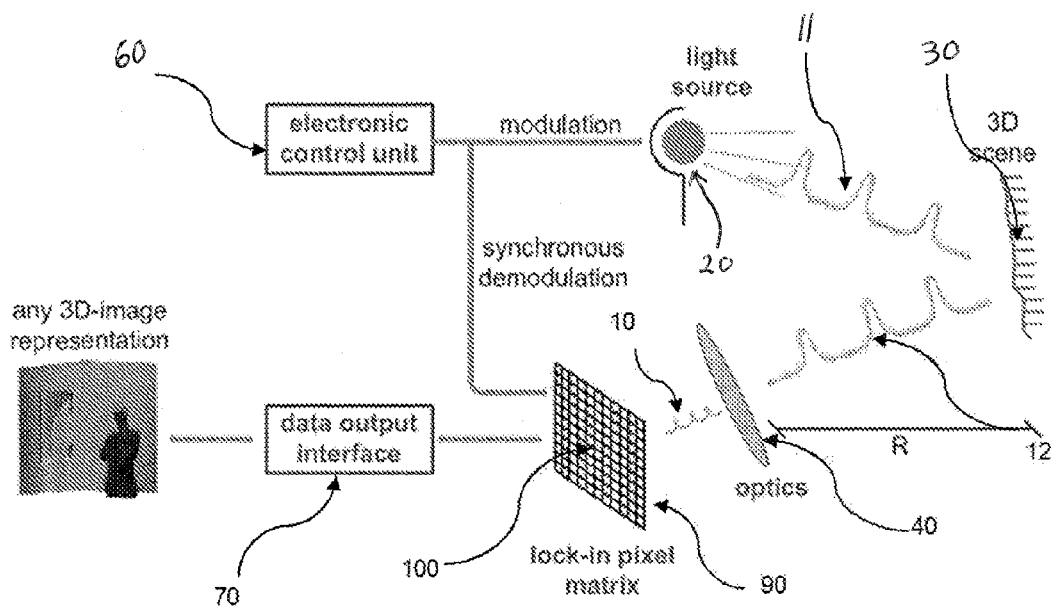
FIG. 1 illustrates the basic principle of a 3D-measurement camera system based on a sensor 90 comprising the demodulation pixels 100.

Modulated illumination light 11 from an illumination module or light source 20 is sent to the object 30 of a scene. A fraction of the total optical power sent out is reflected to the camera, through the optics 40 and detected by the 3D imaging sensor 90. The sensor 90 comprises a two dimensional pixel matrix of the demodulation pixels 100. Each pixel 100 is capable of demodulating the impinging light signal 10. An electronics. control unit 60 controls the timing of the illumination 20 and sensor 100. The demodulation values allow for each pixel to compute the time-of-flight, which, in turn, directly corresponds to the distance information of the corresponding point in the scene. The two-dimension gray scale image with the distance information is converted into a three-dimensional image by image processor IP. This can he displayed to a user via display D or used as a machine vision input.

The distance R for each pixel is calculated by $$R=(c*TOF)/2,$$

with c as light velocity and TOF corresponding to the time-of-flight.

The time-of-flight TOF is obtained by demodulating the light signal impinging, on each pixel. Different modulation schemes are known, for example pseudo-noise modulation, pulse modulation or continuous modulation. The latter technique is used in the following, without restricting the invention to this particular modulation scheme, in order to explain the invention in more detail.

The parallel demodulation of the optical signal by all pixels at the same time enables the delivery of 3D images in real-time, i.e., frame rates of up to 30 Hertz (Hz), or even more, are possible. If continuous sine modulation is used, the phase delay P between the emitted signal and the received signal is corresponding directly to the distance R:

$$R=(P*c)/(4*pi*fmod),$$

where fmod is the modulation frequency of the optical signal. Typical state-of-the-art modulation frequencies range from a few MHz up to a few hundreds of MHz or even GHz.

Figure 2:
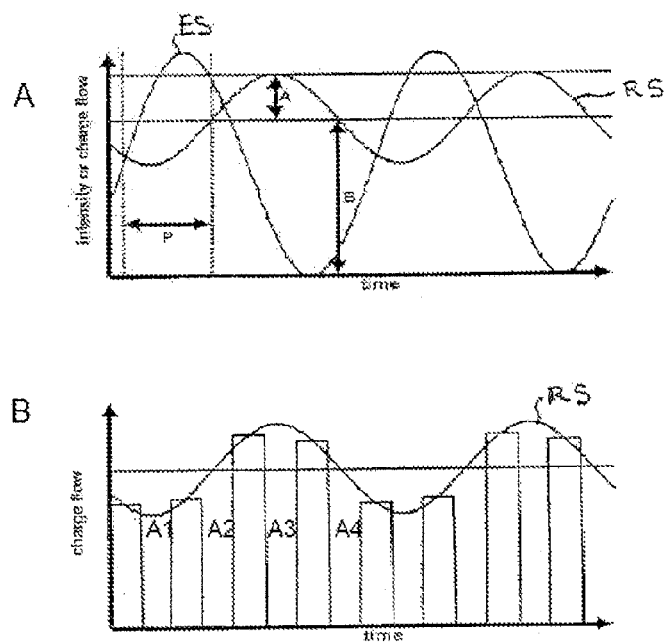
FIG. 2A illustrates emitted ES and received signal RS.
FIG. 2B shows demodulation of the received signal RS.

FIG. 2A and B show examples for the emitted and reflected optical signal when continuous sinusoidal modulation is applied, and for the sampling process of the detected signal, respectively.

FIG. 2A shows both the modulated emitted illumination signal ES and received signal RS. The amplitude A, offset B of the received signal RS and phase P between both signals are unblown, but they can be unambiguously reconstructed with at least three samples of the received signal. BG represents the received signal part due to background light.

In FIG. 2B, a sampling with four samples per modulation period is depicted. Each sample is an integration of the electrical photo-signal over a duration dt that is a predefined fraction of the modulation period. Typically, in demodulation pixels with 4 integration nodes, dt corresponds to a quarter of the period. In order to increase the signal to noise ratio of each sample, the photo-generated charges may be accumulated over several—up to more than 1 million—modulation periods in the integration nodes.

The electronic timing circuit 60, employing for example a field programmable gate array (FPGA), generates the required signals for the synchronous channel activation in the demodulation stage of each pixel.

Using the four samples, the three decisive modulation parameters amplitude A, offset B and phase shift P of the modulation signal can be extracted by the equations $$A = sqrt[(A3-A1)^2 + (A2-A0)^2]/2$$

$$B = [A0+A1+A2+A3]/4$$

$$P = \arctan[(A3-A1)/(A0-A2)]$$

All pixel of a time-of-flight range cameras perform the measurement simultaneously. All pixels as well as the illumination are synchronized to each other. In order to acquire for all pixels the depth simultaneously, the illumination for all pixel is also done in parallel. In many cases, even only one light source is used to illuminate the scene. In most cases, the TOF camera illuminations consist of an array of light sources (LEDs or laser) that are globally controlled by the camera/sensor controller. An optimal approach how to measure the range in the most efficient way has been taught by Oggier in "Time of Flight Camera with Rectangular Field of Illumination", U.S. application Ser. No. 12/837,859. Such an implementation already reduces multiple reflections caused by objects outside the field-of-view, to a certain extent. However, multiple reflections might also occur inside the FOV.

A method to compensate for multiple reflections has further been presented by Schweizer et al. "Multi-Path Compensation Using Multiple Modulation Frequencies in Time of Flight Sensor", U.S. application Ser. No. 13/189,903. The approach involves the use of different modulation frequencies. This method allows compensating for multiple reflections, but noisy depth measurements make a reliable compensation for multiple reflections impossible.

The basic advantage of a parallelized TOF system is that a hill range map can be measured in an extremely fast way, in the ideal case even in a single shot. Other systems require mechanical scanning or suffer from reduced lateral resolution (triangulation).

On the other side, the basic. drawback given by the parallelization of a TOF depth camera is that multiple reflections, so-called multi-path, in the scene might occur.

Figure 3:
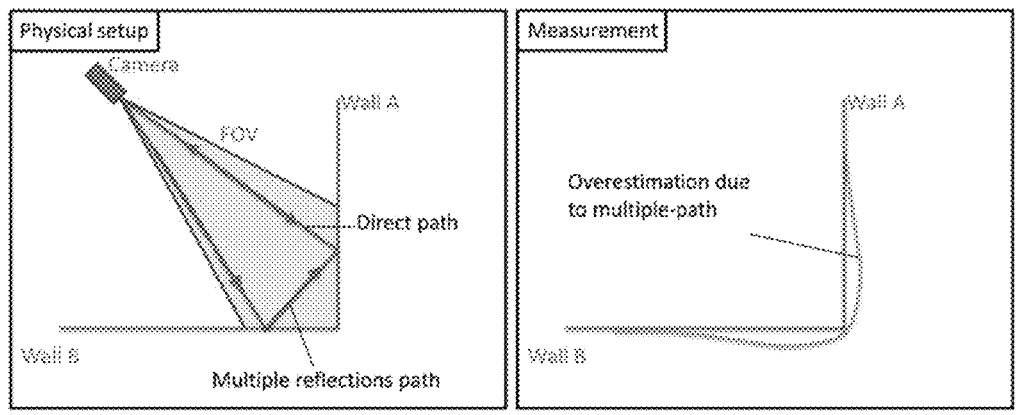
FIG. 3 shows a simple sketch of a multi-path case and the possible resulting dept corruptions.

An example in the 3D of the occurrence of the multi-path case is illustrated in FIG. 3. The depth measurement of the point P in the scene gets corrupted by all the reflected light from the wall to point P and back to the camera. Respecting the third dimension, the impact of illuminating the full FOV in parallel becomes much more severe than in the two dimensional case as described in FIG. 3, since light causing multi-path comes back from all over the wall in the background.

In case the field-of-illumination does not cover the full field-of-view, one can imagine reducing multi-path cases. As a first example, the TOF illumination shows a pattern of an array built of single points.

Figure 4:
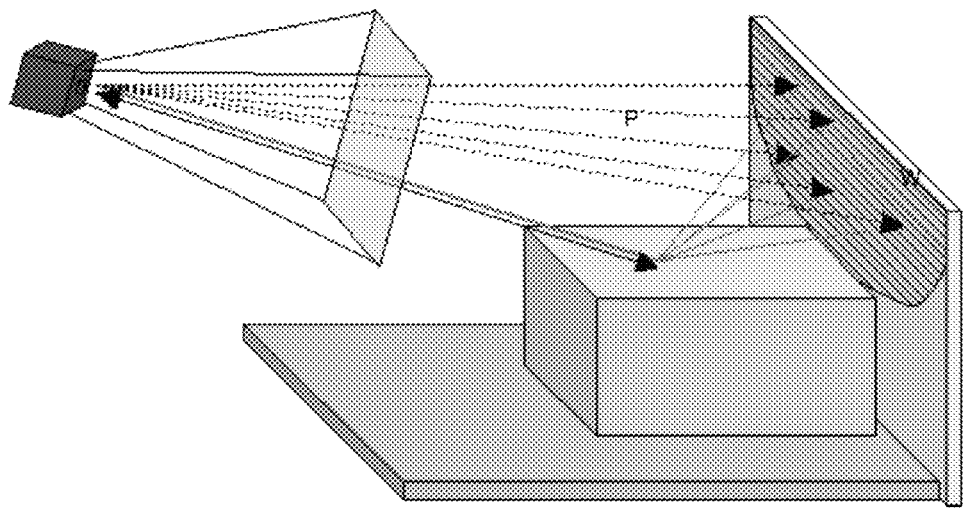
FIG. 4 shows a state-of-the-art TOF camera with field-of-illumination (FOI) covering as much as possible the field-of-view (FOV) illustrating multiple reflections.

The results of a TOP camera with a state-of-the-art illumination (FIG. 5A) are sketched in FIG. 4. In this case, severe multi-path errors might occur as indicated.

Figure 5:
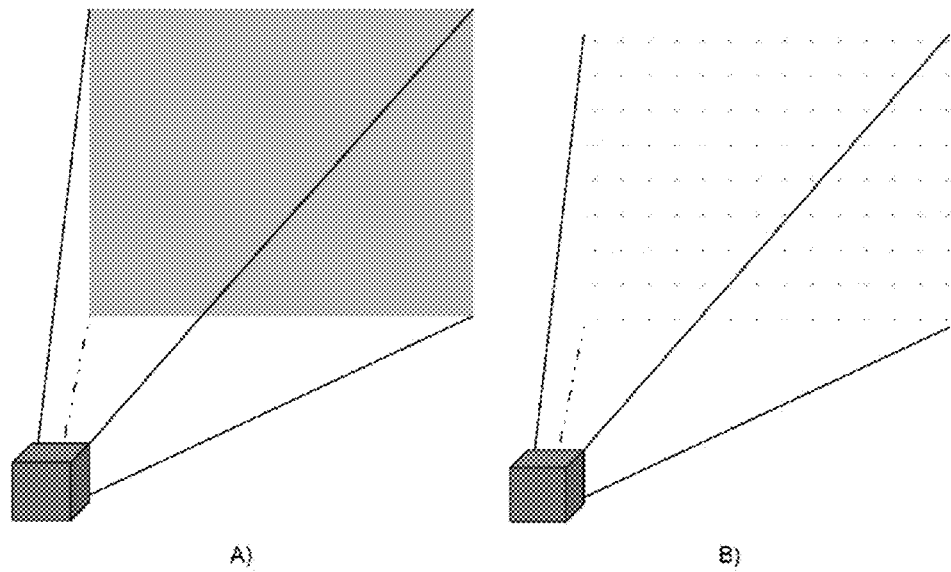
FIG. 5A shows a TOF camera with a typical FOI.
FIG. 5B shows a TOF camera with a reduced FOI consisting of an array of points.

On the other side. the same scene captured with an illumination as drawn in FIG. 5B shows reduced multi-path.

Figure 6:
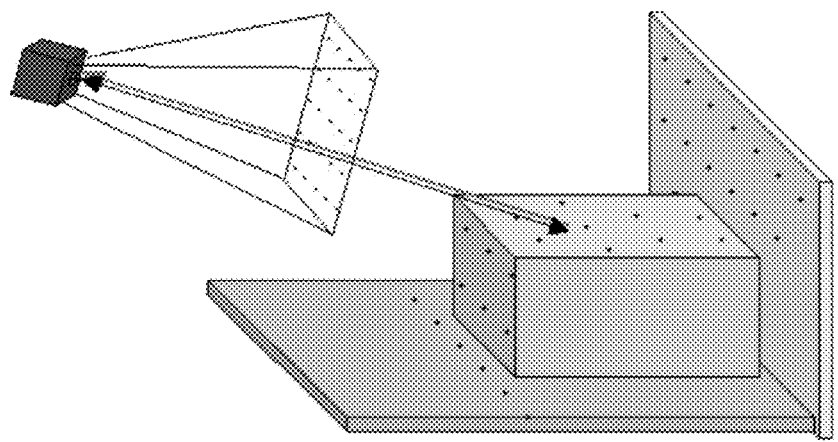
FIG. 6 is a TOF camera with a FOI being a point array.

While in FIG. 4 to full wall contributes to the multi-path on a point with only little direct back-reflected light. FIG. 6 has reduced source of possible multi-path points and, furthermore, the direct back-reflected light is concentrated on a single point. Therefore, the ratio between direct back-reflection and multi-path reflections is much more favorable in the point-array illumination.

With respect to multi-path, the less the illumination power is spread over the scene, the less multi-path occurs. In other words, the more the number of illuminated spots can be reduced, the more multi-path is reduced. Going to its extreme, the ideal case would be a single spot TOF measurement. In that case, the lateral resolution gets lost.

As proposed by the invention, this first embodiment combines the measurement of a state-of-the art illumination—guaranteeing the biggest possible lateral resolution—while adding a measurement with an illumination, which is more illumine against multi-path effects.

The implementation of two spatially different coding schemes can be done simply by capturing two depth maps and combining them. The two illuminations might by physically different, or consist of the same light source but different optical elements. It can also be imagined to fuse both spatial codings into one exposure.

In the case that a standard depth map with highest lateral resolution and one with lower lateral resolution but higher immunity against multi-path are captured, the two images are preferably combined into one single 3D depth using the lower resolution depth points as absolute measurement values and interpolating these points based on the measurement gained from the high-resolution acquisition.

Figure 7:
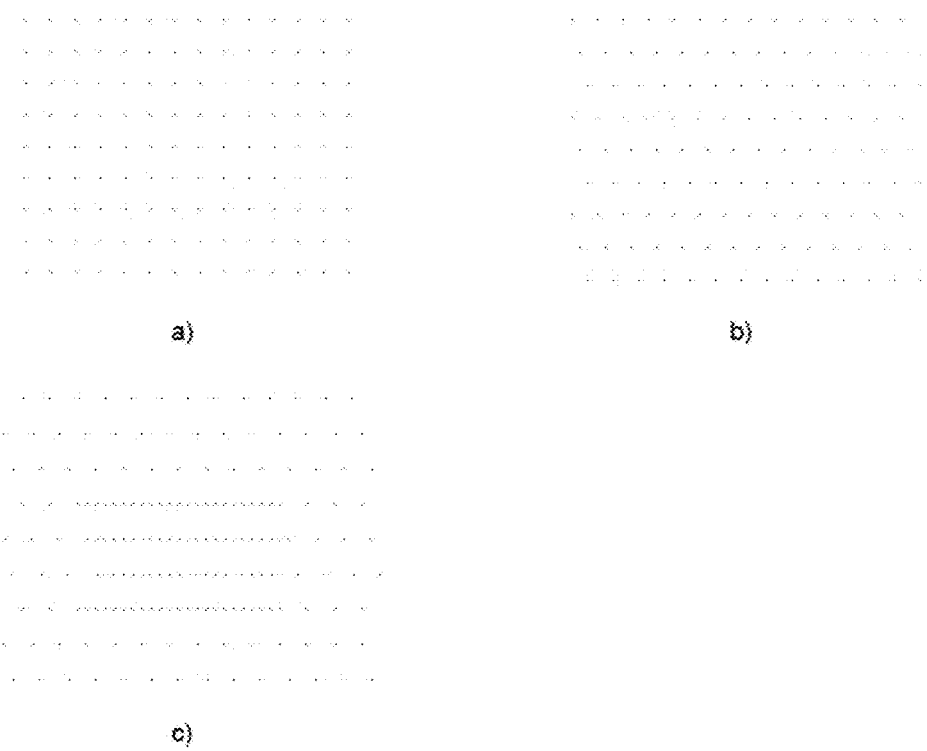
FIG. 7 illustrates a possible point-array illumination for the reduced lateral 3D resolution image. Top left: equi-distant point array; top right: misaligned point-array illumination; bottom left: point-array illumination with higher lateral resolution at specific area.

Further imaginable spatially structured illuminations are sketched the FIG. 7.

In a $2^{nd}$ embodiment, the two FOI consist as a first FOI as used in state-of-the-art TOF cameras (see FIG. 5A and a second FOI in a stripe-shaped form. The stripe can be horizontal, vertical or even skewed. Several illumination lines also might be possible for this purpose.

Again, the invention proposes to use the lower lateral resolution image given by the stripe-shaped illumination for multi-path compensation and the standard illumination to achieve the high lateral resolution.

The application of measuring the sizes of boxes seems to be an ideal fit for TOF technology. The application requires small devices, robust and low-power design, low manufacturing costs and depth/lateral resolutions in the range of a few millimeters.

A critical setup for this measurement with respect to multi-path is sketched in FIG. 4 and FIG. 6.

The measurement using structured light (e.g. array of points as given in the first embodiment or line-shaped illumination as in the $2^{nd}$ embodiment) can be used to compensate for multi-path and the high resolution depth map can be captured with the full FOI.

The measurement with the tower lateral resolution as described in the first embodiment can further be used as the structured light sources for triangulation measurement. The outcome of the triangulation system can further be combined with the TOF range measurement results.

What is claimed is:

1. A time of flight camera system for generating depth information, the system comprising:
   an illumination module for illuminating an object with modulated light;
   a sensor including an array of demodulation pixels for demodulating the light reflected by the object;
   an image processor that determines depth information for the object using the modulated light detected by the sensor,
   wherein the illumination module illuminates the object with at least two spatially different coding schemes, wherein the image processor generates at least a first depth map from a first one of the coding schemes and a second depth map from a second one of the coding schemes, wherein the image processor uses the first and second depth maps to generate a combined depth map and compensate for multipath errors.

2. A system as claimed in claim 1, wherein the first coding scheme of the different coding schemes covers a full field of view of the sensor and the second coding scheme of the different coding schemes is projected as a stripe shaped region encompassing less than the full field of view of the sensor.

3. A system as claimed in claim 1, wherein the first coding scheme of the different coding schemes covers a full field of view of the sensor and the second coding scheme of the different coding schemes is projected as an array of points in the field of view of the sensor.

4. A system as claimed in claim 1, wherein the first coding scheme of the different coding schemes is projected onto the object so as to cover an entire field of view of the sensor and the second coding scheme of the different coding schemes is projected onto the object so as to cover only part of the field of view of the sensor.

* * * * *